Aug. 18, 1936.   C. FIELD   2,051,035
APPARATUS FOR CLOSING CARTONS
Original Filed April 16, 1923   8 Sheets—Sheet 1
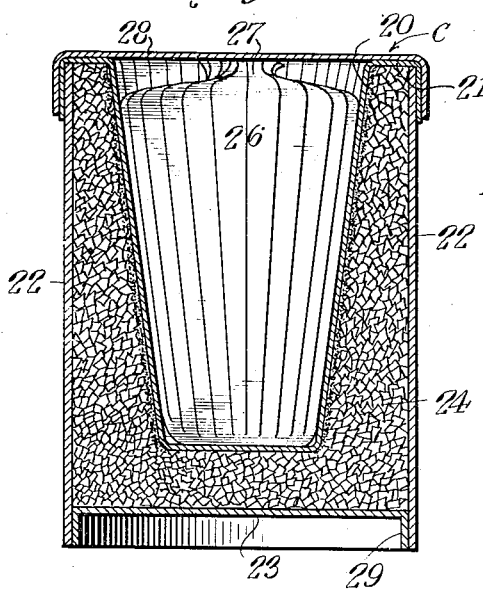
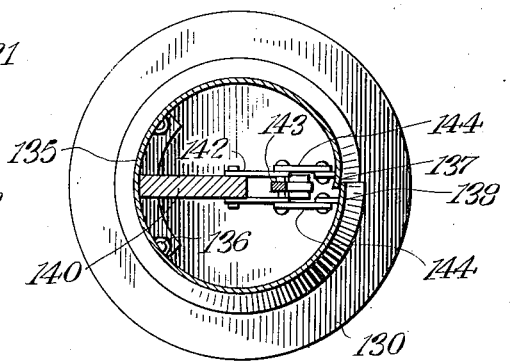
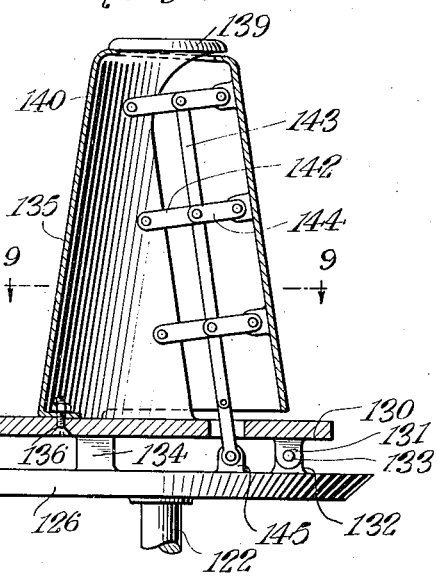
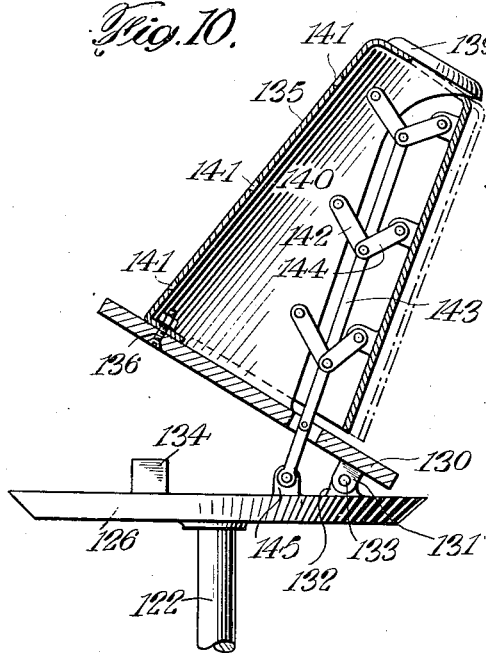
INVENTOR.
Crosby Field
BY
Emery, Booth, Janney & Varney
ATTORNEYS.

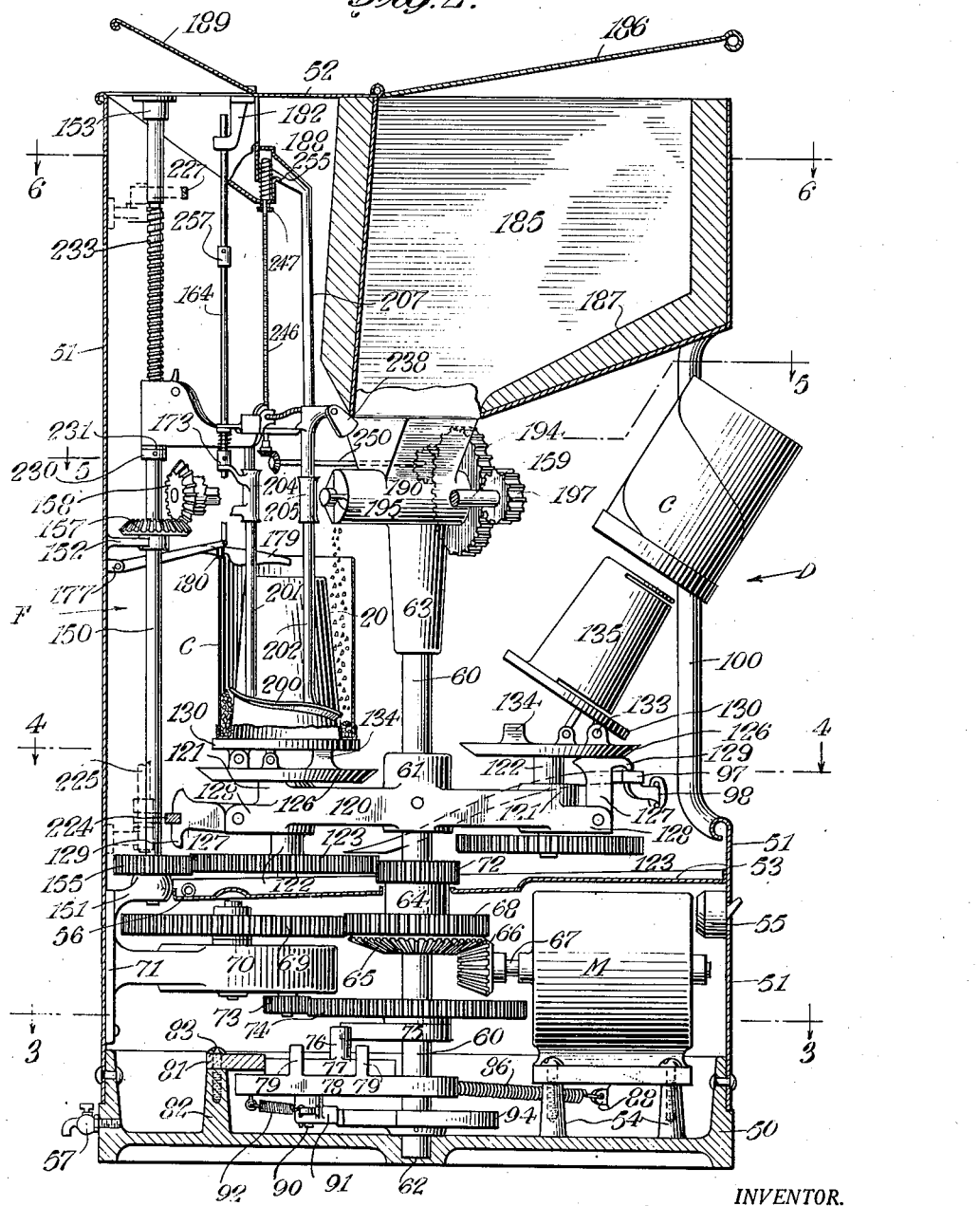

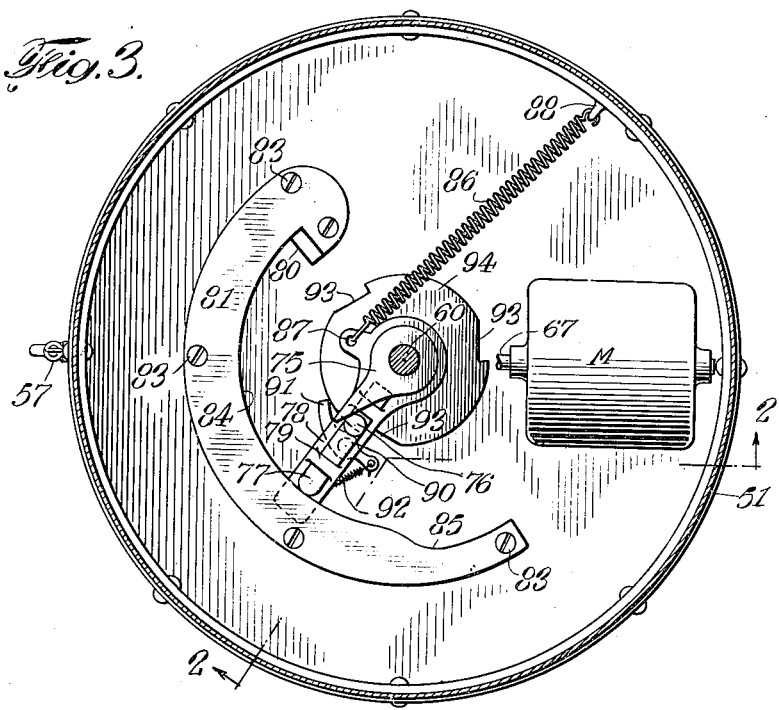
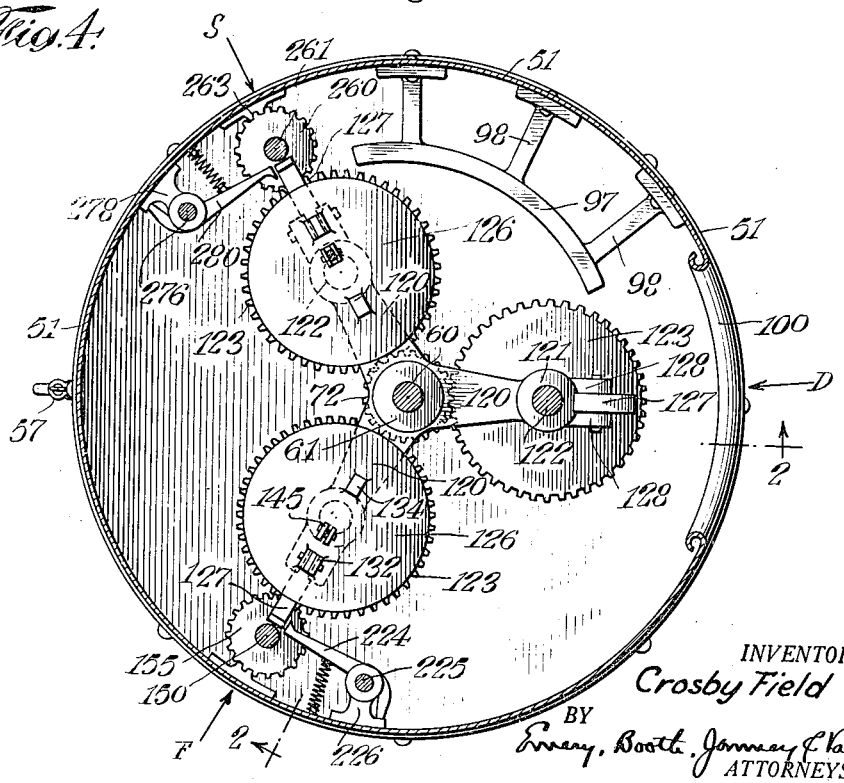

Aug. 18, 1936.　　　　C. FIELD　　　　2,051,035
APPARATUS FOR CLOSING CARTONS
Original Filed April 16, 1923　　8 Sheets-Sheet 4

INVENTOR.
Crosby Field
BY
Emery, Booth, Janney & Varney
ATTORNEYS.

Aug. 18, 1936.     C. FIELD     2,051,035
APPARATUS FOR CLOSING CARTONS
Original Filed April 16, 1928    8 Sheets-Sheet 5

INVENTOR.
Crosby Field
BY
Emery, Booth, Janney & Varney
ATTORNEYS.

Aug. 18, 1936.   C. FIELD   2,051,035
APPARATUS FOR CLOSING CARTONS
Original Filed April 16, 1923    8 Sheets-Sheet 6

INVENTOR.
Crosby Field
BY Emery, Booth, Janney & Varney
ATTORNEYS.

Aug. 18, 1936.   C. FIELD   2,051,035
APPARATUS FOR CLOSING CARTONS
Original Filed April 16, 1923   8 Sheets-Sheet 7
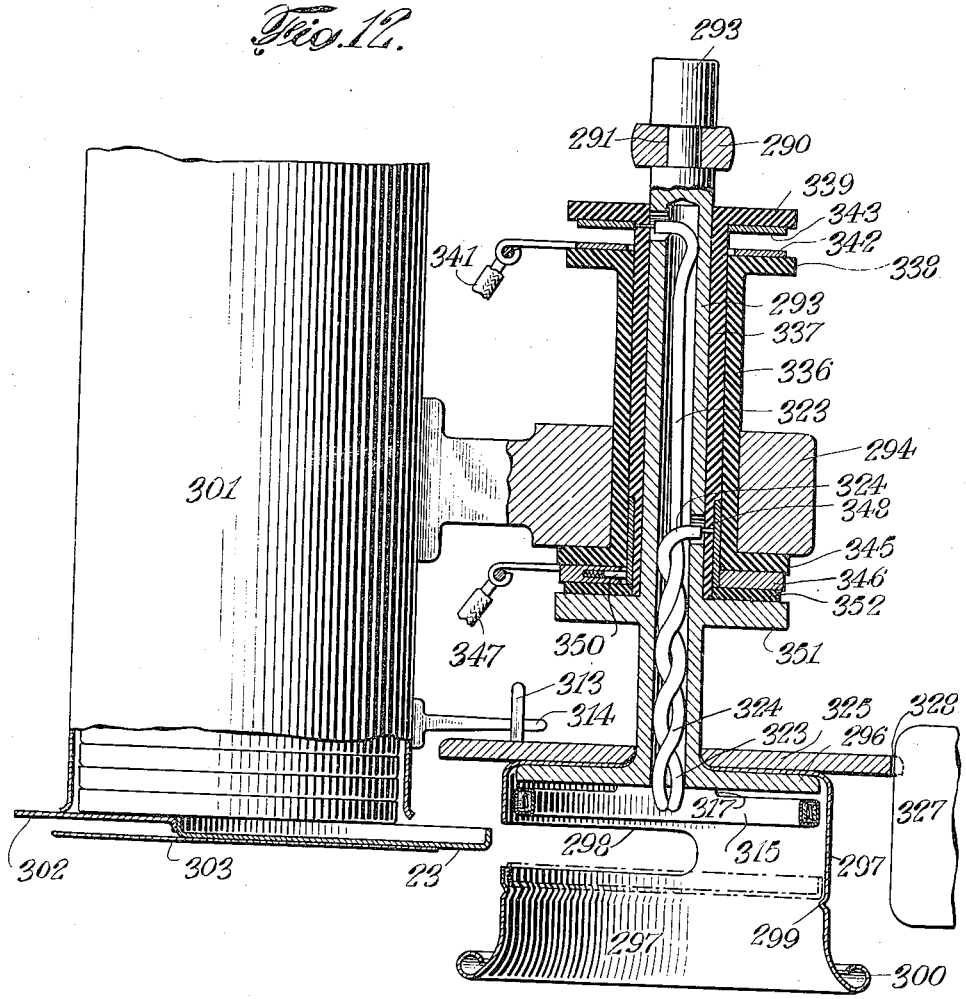
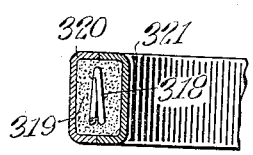
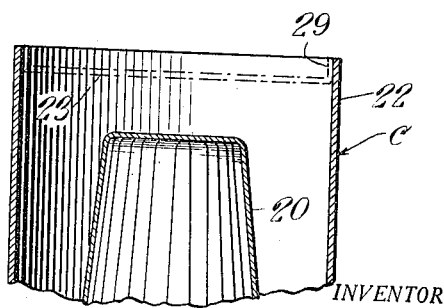

Aug. 18, 1936.                C. FIELD                2,051,035
APPARATUS FOR CLOSING CARTONS
Original Filed April 16, 1923    8 Sheets-Sheet 8
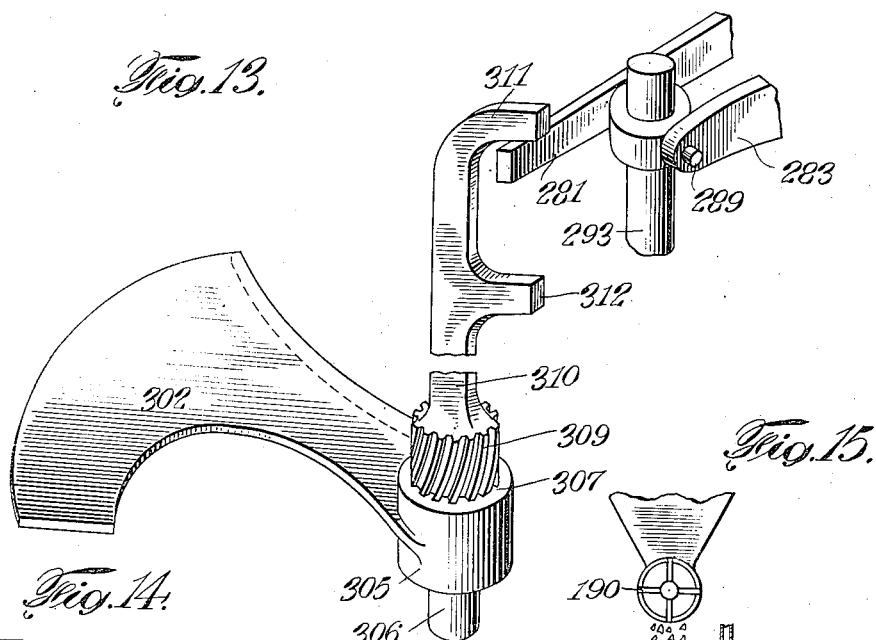
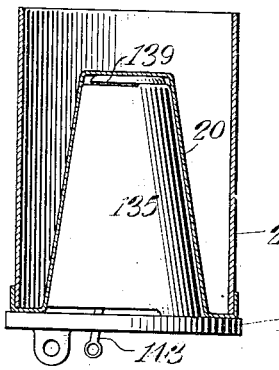
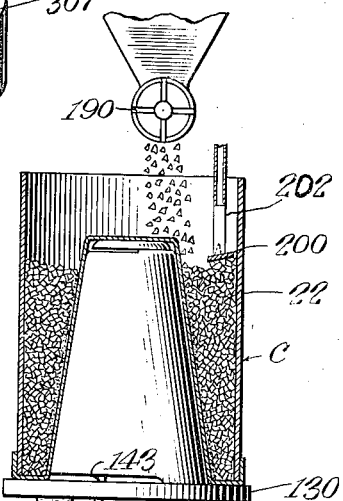
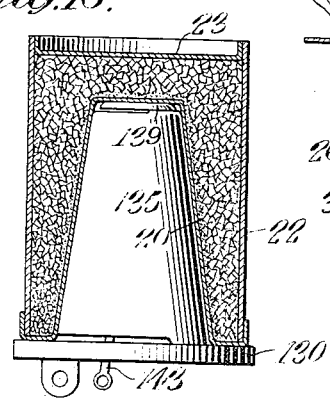
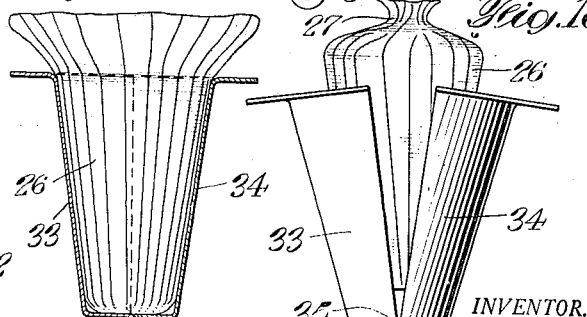
INVENTOR.
Crosby Field
BY
Emery, Booth, Janney & Varney
ATTORNEYS.

Patented Aug. 18, 1936

2,051,035

UNITED STATES PATENT OFFICE 2,051,035

APPARATUS FOR CLOSING CARTONS

Crosby Field, Brooklyn, N. Y., assignor to Flakice Corporation, Brooklyn, N. Y., a corporation of Delaware Application April 16, 1928, Serial No. 270,257
Renewed August 17, 1932

28 Claims. (Cl. 226—92)

This invention relates to the art of preserving perishable substances and particularly to portable cartons.

It has hitherto been common practice to pack perishable substances such as ice cream and the like in considerable quantities in containers surrounded by a refrigerant, usually crushed ice and salt, carried within larger outer containers. It has also been common to pack smaller quantities of such perishable substances in single-chambered cartons intended to be stored in refrigerators pending final disposition. In the former case the containers have usually been relatively large, heavy and subject to leakage of the melting refrigerant, and in the latter case the cartons, once removed from the refrigerator, have failed to protect their contents from melting or other deterioration.

Among the objects of the present invention is the provision of an inexpensive light carton designed to carry both a quantity of the substance to be preserved and a quantity of refrigerant without danger of inter-mixture of the two materials and without liability of leakage of either from the carton; and the provision of means to facilitate loading cartons with substance to be preserved.

A further object is to provide automatic machinery whereby such cartons may be rapidly and effectively charged with refrigerant and the refrigerant effectively sealed in place.

Such cartons, when so charged with refrigerant, may then be filled with any perishable substance with assurance that the latter will remain at low temperature for a relatively long period of time, regardless of where the carton may be kept or how it may be handled.

One form of mechanism for charging the cartons with refrigerant in accordance with my method is so designed that an empty carton may be fed into the device at a point hereinafter designated as the delivery station, and from there passed to a second station where the carton is automatically charged with refrigerant, and then passed to a third station where the refrigerant is automatically sealed in place within the carton which is then returned to the delivery station for removal by the operator,—the operator having only to remove charged cartons and insert empty ones at the delivery station.

One illustrative embodiment of the invention is hereinafter described and shown in the accompanying drawings wherein:

Fig. 1 is a sectional view of the preferred form of carton employed, the carton being shown filled both with refrigerant and the substance to be preserved;

Fig. 2 is a vertical sectional view of one form of machine which may be employed for filling the cartons with refrigerant and for applying and sealing the refrigerant-retaining caps, the section being taken approximately on the line 2—2 of Figs. 3, 4, 5, and 6.

Fig. 3 is a horizontal section taken on the line 3—3 of Fig. 2;

Fig. 4 is a horizontal section taken on the line 4—4 of Fig. 2;

Fig. 8 is an enlarged sectional view of the carton-holding mechanism;

Fig. 9 is a section taken on line 9—9 of Fig. 8;

Fig. 10 is a view similar to Fig. 8 but showing the parts in position for receiving a carton as shown in Fig. 2;

Fig. 12 is an enlarged section showing the details of the cap-applying and sealing mechanism;

Fig. 12A is an enlarged section of a heating element associated with the sealing mechanism shown in Fig. 12.

Fig. 13 is a detail elevation of certain elements of the cap-applying mechanism;

Fig. 14 is a view of a carton as placed on the carrier;

Fig. 15 is a view of the carton partly filled with refrigerant;

Fig. 16 is a view of the carton with the refrigerant sealed therein;

Fig. 17 is a view of a mold for packaging the substance to be preserved, showing the manner of using the mold, and Fig. 18 is a similar view of the mold open and the package closed and partially removed from the mold.

Figure 5:
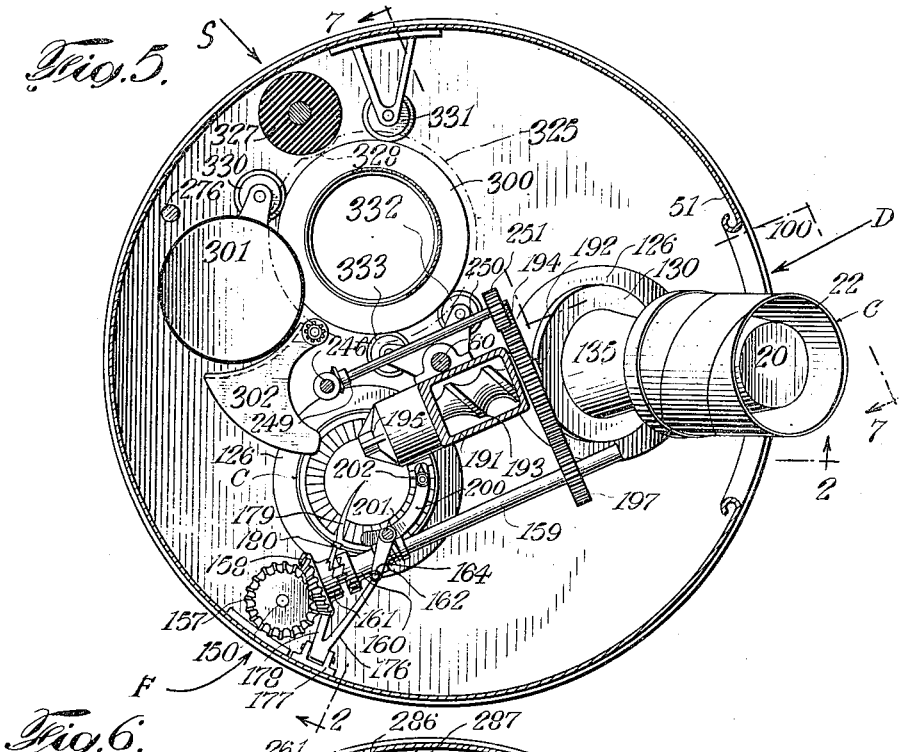
Fig. 5 is a horizontal section taken on the line 5—5 of Figs. 2 and 7.

The carton most suitable for present purposes may be said to consist in general of an inner cup for the substance to be preserved and an outer surrounding container for holding the refrigerant. Preferably the refrigerant will not only surround the inner cup, but also will overlie one or both of its ends.

Referring to Fig. 1 which shows the preferred form of cylindrical carton C filled both with the substance to be preserved and the refrigerant all sealed and ready for delivery to the consumer, the inner cup 20 may be made up of a single sheet of fairly light paper pleated to avoid the necessity of any seam. This inner cup may be waxed or otherwise treated to render it impervious and form-retaining. The cup 20 is provided at its upper edge with a laterally extending flange 21 which is bent over and secured to the edge of an outer concentric container 22, the latter preferably being of a heavier construction. The outer container 22 may, for example, be made of overlapping layers of spirally wound cardboard suitably waxed or otherwise treated to make it impervious. Closing the lower end of the container 22 the circular disc 23 (hereinbefore termed a cap) is sealed to and within the peripheral edge of the container 22, thus forming a closed chamber 24 to contain the refrigerant.

The substance to be preserved may be placed directly in the cup 20, but preferably it is first placed in a light seamless sack 26 also made of a single sheet of paper pleated and waxed.

This sack 26 may be filled in any suitable manner. For example, it may be placed in a mold of the same size and shape as the inner cup 20, and then filled with the substance to be preserved, the upper flared edge 27 being necked in after filling. While obviously such mold may be of any suitable nature, a particularly useful one is shown in Figs. 17 and 18 wherein the mold is shown to comprise two complementary parts 33, 34 connected at the bottom by a hinge 35. When the sack 26 is filled to the top of the mold the latter may be spread apart to permit the easy removal of the filled sack.

Handling the filled sack is facilitated by the neck portion 27 which does not transmit heat from the hand to the contents. Further, as shown in Fig. 1, it will form a spacing means between the sack and the container cover 28, creating a dead air insulating space, and even though no refrigerant be used at that end, the carton, when packed, will still be satisfactorily heat-excluding, the cover 28 being arranged to fit tightly upon the upper end of the container 22.

From the above description it will be readily understood that the inner cup 20 of the carton may be filled without difficulty by hand. If desired, the refrigerant chamber surrounding the cup 20 might also be charged by hand. Preferably, however, the introduction of the refrigerant is accomplished by machine, and one form of machine found suitable for this purpose will now be described.

As stated above, the preferred apparatus is largely automatic in its operation and performs the several operations necessary to charging the carton with refrigerant at various successive positions, the cartons being moved intermittently from one position to the next. The cartons are preferably held so that the refrigerant material may pass into them by gravity. To this end the carton is carried by the apparatus in the position shown in Figs. 14 to 16, i. e., in inverted position to that shown in Fig. 1.

Such apparatus in the present case comprises structural frame work to support the various mechanisms, which include a motor for supplying power; mechanism for imparting the desired intermitten successive movements to the parts; mechanism for holding the cartons securely but without liability of damaging them; mechanism for preparing and feeding the refrigerant in suitable quantities and at the proper time; mechanism for rotating the cartons about their own axes so that the refrigerating material will be properly distributed in the cartons; mechanism for tamping the refrigerant in place as supplied mechanism for supplying, positioning and sealing caps to enclose the refrigerant in its chamber and ancillary mechanism to insure the proper successive operation of the parts.

Referring to the lower portion of Fig. 2, the general framework of the apparatus rests upon a circular base 50, from which rises a cylindrical casing 51, closed at the top by a cover 52, to enclose the working parts.

The initial introduction and positioning of the cartons, their charging with refrigerant, and the sealing of the refrigerant therein, are performed by the apparatus in three successive steps at three successive stations, the carton-supporting and carrying devices being arranged to turn from station to station in a circular path.

In order that the mechanism at all three stations may be in operation simultaneously, the carton-carrying mechanism is equipped to support three cartons equidistant from each other, as indicated in Fig. 4. The empty cartons are manually inserted and positioned in the machine at the station hereinafter described as the delivery station D; are automatically supplied and packed with refrigerant at the next station which will be designated as the filling station F; and the refrigerant-retaining discs are automatically positioned and sealed on the cartons at a third station to be designated as the sealing station S, from which station the charged cartons are automatically returned for manual removal at the delivery station D.

Still referring to Figs. 2 and 4, the supporting means or carrier for the cartons is borne by a central vertical shaft 60 to which are fixed through the hub 61 three radial equally spaced supporting arms 120.

The shaft 60 is supported at its lower end in a bearing 62 formed in the base 50, and at its upper end by a stationary bearing 63.

Near the lower right hand corner of Fig. 2 a motor M is mounted upon lugs 54 projecting from the base 50. To the right of the motor a control switch 55 is shown secured to the casing 51. Over the motor a protective inclined drip plate 53 may be provided, there being a drain spout 56 at the lower edge of the plate for carrying collected liquid out of the casing 51. If desired a drain spout 57 may also be provided at the bottom of the casing 51 and both of the spouts may be provided with a hand valve.

Mounted rotatably but non-slidably upon the shaft 60 is a sleeve 64 integrally provided with a bevel gear 65 meshing with and driven by a bevel gear 66 fixed upon the shaft 67 of the motor M. The sleeve 64 also carries a spur gear 68 which meshes with and drives a spur gear 69 on the high speed side of a reducing gear train housed in a gear box 70 carried by a bracket 71 secured to the left hand side of the casing 51. Immediately below the gear box 70, the low speed pinion 73 of the gear train meshes with and drives the gear 74 which is also rotatably but non-slidably mounted on the shaft 60. Below and integral with the gear 74 is a driving member 75 sufficiently identified as a cam. The cam 75, driven as above indicated, rotates slowly at uniform speed and at a certain point in each revolution strikes the upwardly extending lug 76 of the bolt 77 slidably secured (see Fig. 3) upon the arm 78 which is free to turn but not to slide upon the shaft 60. The bolt 77 is slidably secured upon the arm 78 by means of strap guides 79 integral with the arm 78.

As best shown in Fig. 3, generally concentric with the arc described by the free end of the arm 78, an arcuate abutment member 81 is secured by screws 83 to the curved rib 82 upstanding from the base 50. The abutment member 81 has a curved inner face 84 which, throughout the greater portion of its length, describes an arc about the shaft 60, but at the lower end of the abutment member 81 the radius of the inner face of this member increases, forming a portion 85 which is farther from the shaft 60 than the rest of the inner face of the abutment member.

The upper end of the abutment member 81 is inwardly hooked to support a buffer pad 80 against which the oscillatory arm 78 lies when the latter is in its normal position, toward which position the arm 78 is yieldingly urged by the spring 86 tensioned between the ear 88 fixed to the casing and the arm 87 integral with the arm 78. It will therefore be evident that when the cam 75 first engages the lug 76 of the bolt 77 it will drive the bolt and the arm 78 in a counterclockwise direction (as viewed in Fig. 3) for the bolt is restrained from outward movement by the arc-shaped face 84 of the abutment member 81, which consequently prevents the lug 76 from sliding along and escaping past the end of the cam. But when the bolt 77 reaches the receding portion 85 of the abutment member 81 it is free to move outwardly and the lug 76 will then escape from operative contact with the cam 75, freeing the arm 78 which is then returned to its normal position by the spring 86 previously referred to.

The arm 78 is provided with a downwardly extending pin 90 whereon is pivoted a pawl 91, the operative end of which is urged inwardly by a spring 92 against a ratchet disc 94 rigidly secured to the shaft 60.

The periphery of the ratchet disc 94 is provided with three notches 93 equidistant from each other and corresponding in position to the carton-carrying arms 120. As the arm 78 pivots counterclockwise upon the shaft 60 and approaches the point at which, due to the radial movement of the bolt 77 the arm 78 is freed to be returned to its normal position, the pawl 91 engages one of the notches 93 so that when the arm 78 is released from the cam 75 not only will the arm be returned to its normal position against the buffer pad 80, but it will carry with it the ratchet disc 94, rotating the shaft 60 clockwise through one-third of a revolution. The friction of parts will be sufficient to prevent the shaft from turning by momentum beyond the point to which it is thus carried by the pawl.

The cam 75 will then continue to turn counterclockwise through the remainder of the revolution before it again engages the bolt, thus providing a period of rest for the shaft 60 and the carton-carrying elements during which period each of the carton-carrying elements is at one of the three operative stations where, respectively, cartons are being delivered, charged with refrigerant, and sealed. By the time the cam 75 has completed its rotation the various operations at each of the three stations have been completed and the cam 75 causes a repetition of the mechanical movements last described, whereby each carton is advanced to the next station, one completely charged and sealed carton being manually removed by the operator and replaced by an empty carton at the delivery station D.

Having now generally described how empty cartons are introduced into the apparatus, advanced from station to station therein at which stations are performed the successive operations necessary to charging the cartons with refrigerant, sealing the refrigerant in the carton and returning the charged and sealed carton to the operator, attention will be called to the means for holding and rotating the cartons on the carton-carrying means and to the various mechanisms operative at the three stations at which each carton successively halts.

The means for holding the cartons in position and for rotating them about their own axes is the same as to each of the three carton-carrying elements and need only be described as to one.

Figure 7:
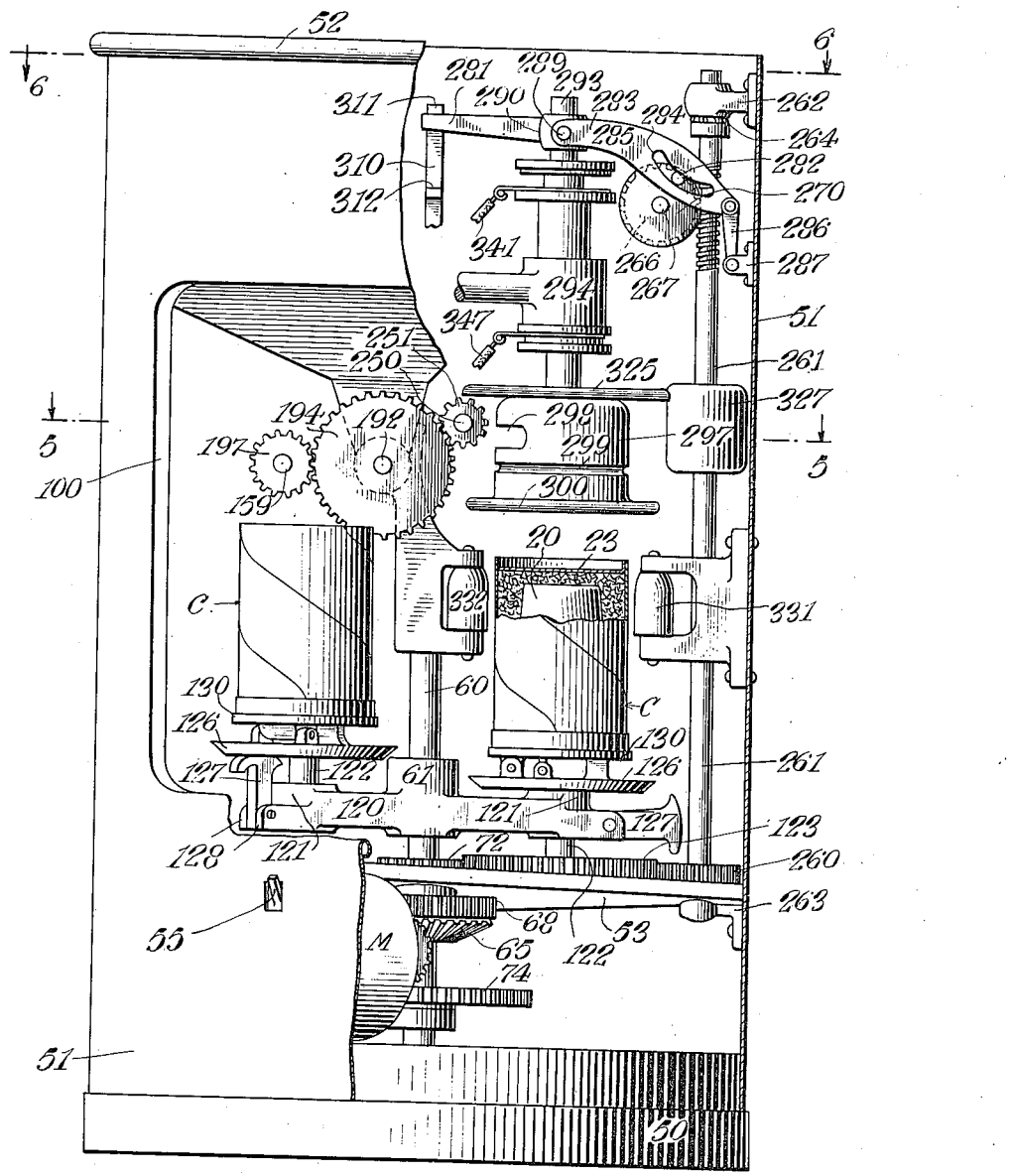
Fig. 7 is a vertical section taken on the line 7—7 of Fig. 5.

Referring to Figures 2, 4, and 7, it will be observed that each of the three carton-carrying arms 120 is provided at its outer end with a vertical bearing 121 wherein is slidably and rotatably mounted a shaft 122 which bears upon its upper end a carton-carrying table 126. The shaft 122 is slidable in the bearing 121 between a lower or operative position and an upper or inoperative position. Fixed on the lower end of the shaft 122 is a gear 123 which, when the shaft 122 is in its lower position, is adapted to mesh with and be rotated by the gear 72 of the gear sleeve 64 which is constantly driven by the motor. And it will be observed that the gear 123 will mesh with and be driven by the gear 72 regardless of the position to which the arm 120 has been turned, since the arm 120 and its shaft 122 revolve in a circular path about the shaft 60.

Due to gravity the gear 123 and its connected parts are normally in the lower or operative position; but between the table 126 and the gear 123 a strut 127 is pivoted upon lugs 128 integral with the arm 120 and when in upright position (as shown at the right hand side of Fig. 2 and at the left hand side of Fig. 7) serves to hold the table 126, shaft 122 and gear 123 in the upper or inoperative position, in which position these parts are not rotated.

By mechanism hereinafter to be described each carton-carrying table upon arrival at the delivery station D, has been automatically raised to its upper inoperative position so as to facilitate the removal of the completely charged and sealed carton from the table and its replacement by an empty carton.

The right hand portion of Fig. 2, then, shows the carton-carrying table 126 in raised non-rotating position in which position it may be readily relieved of the charged and sealed carton and loaded with an empty carton.

*Mechanisms and operations at the delivery station D*

At the delivery station D, where cartons charged with refrigerant are removed and empty cartons introduced, it is important to note the details of the carton-holding devices which (as shown in Figs. 2, 7, 8, 9, and 10) are mounted upon the upper surface of the carton-carrying table 126. Hinged upon the table 126 through lugs 131, 132 and pivot pin 133, is the plate 130 which may be tipped toward the operator as shown at the right hand portion of Fig. 2 and in Fig. 10. In its normal horizontal position of rest the plate 130 is supported by the lug 134 extending upwardly from the table 126. Mounted upon the plate 130 is a hollow expansible mandrel 135 shown in detail in Figs. 8, 9, and 10. This mandrel may be secured in place by screws 136. It is preferably formed of relatively thin flexible metal and is slit from top to bottom at one side to provide over-lapping edges 137 and 138. For a considerable distance on both sides of these over-lapping edges the mandrel is free of the plate 130 to permit its contraction and expansion respectively to facilitate the removal and replacement of cartons and their firm holding in position for subsequent operations.

The upper end of the mandrel 135 may be covered by a protecting cap 139 attached to the non-expansible portion which may be strengthened by a vertical interior rib 140 secured to the plate 130. If desired the mandrel 135 may be secured to the rib 140 at spaced points 141 by soldering or otherwise.

For causing the mandrel 135 to contract and expand, a double toggle mechanism is arranged to operate between the rib 140 and the free overlapping edges 137, 138 of the mandrel. Three pairs of spaced toggle links 142 are pivoted at their inner ends to the rib 140 and at their outer ends to the upstanding rod 143, complementary pairs of toggle links 144 being pivoted at their inner ends to the links 142 and the rod 143 and at their outer ends to the over-lapping edge portions of the mandrel 135, one set of toggles being connected to one edge and the other set to the other edge. The lower end of the rod 143 passes through an opening in the plate 130 and is pivoted to a lug 145 upon the table 126.

By this arrangement when the plate 130 is manually tipped outwardly by the operator into the position in which it is shown in Fig. 10, and at the right hand portion of Fig. 2, the toggles will be operated to draw inwardly the over-lapping edges of the mandrel, in effect reducing its diameter. In this condition the carton which has just been charged with refrigerant may readily be removed from the mandrel by the operator through the aperture 100 provided in the casing 51 at station D and an empty carton replaced upon the mandrel. As will have become apparent, the carton is fitted over the mandrel in inverted position relative to that shown in Fig. 1 (as indicated in Fig. 14). When the empty carton has been so positioned on the mandrel the operator may then tip the mandrel and plate 130 back to horizontal position, as shown in Fig. 8; and by this return movement the toggles 142, 144 reversing their action, expand the mandrel to fit tightly within the cup portion 20 of the carton, thus holding the carton in rigid upright position (as shown in Fig. 14) ready for subsequent filling with refrigerant, the cup portion 20 being supported by the mandrel in a manner calculated to prevent injury during the charging operation.

Having positioned an empty carton upon the mandrel and having tipped the mandrel back to its normal upright position, it only remains for the operator to lower the table 126 to its operative position so that the gear 123 may mesh with the driving gear 72. This lowering is accomplished manually by throwing down the strut 127 which has been supporting the table 126, the strut being so designed that it cannot drop to a position lower than horizontal, in which position it serves, as the arms 120 turn from station to station, to strike certain members at the filling and sealing stations and so, at the proper time, to initiate the operation of certain mechanisms at those stations which will be hereinafter described.

If a strut 127 be allowed to remain upright, holding the table 126 and its associated parts in their inoperative position, the strut 127 will fail to make contact at the filling and sealing stations with the result that the mechanisms located there will not operate while the table 126 is at those stations.

The empty carton having been properly positioned upon the mandrel, the mandrel having been tipped back so as to expand within and hold the carton upright, and the strut 127 having been dropped to its horizontal position for the purposes above referred to, the continued operation of the driving mechanisms will, at the proper time, swing the arms 120 through another third of a revolution, bringing another charged carton within reach of the operator's hand at station D and moving the empty carton to its position at the filling station F where it is charged with refrigerant in the manner hereinafter described.

*Mechanisms and operations at the filling station F*

About the filling station F are grouped containers for storing and supplying refrigerant (preferably separated quantities of ice and salt), means for crushing the ice and feeding it into the cartons, means for feeding salt along with the ice into the cartons, means to cause the mixed ice and salt to be properly disposed in the annular chamber of the carton provided therefor, means to tamp the refrigerant in the cartons during the process of filling, and means to initiate and to stop at the proper times the operation of the mechanical parts serving the above purposes, leaving them in position to recommence their operations upon the arrival of another empty carton.

The mechanisms operative at the filling station F are best shown in Figs. 2, 4, 5, and 11.

Referring first to the central left hand portion of Fig. 2, the carton C is there shown at the filling station F in process of being charged with refrigerant. For this purpose the carton is seen to be positioned beneath the discharge end of an ice crusher 190 which is surmounted by a hopper located underneath the ice bin 185. Extending downwardly into the refrigerant chamber of the carton C the two rod-shaped members 201, 202 guided by fixed sleeves 204, 205, will be seen to terminate in a curved flexible shoe 200 which is designed to ride upon the rising surface of the refrigerant and to deliver to the refrigerant successive downward blows to tamp it properly in place. And lying within the upper edge of the carton C the scraper 179 serves to spread the refrigerant toward the outside walls of the carton so that the annular refrigerant chamber of the carton may be uniformly supplied and evenly filled; and salt is fed into the carton through the vertical member 202 which is made hollow for that purpose and communicates with a salt bin indicated at the upper left hand portion of Fig. 2, by the numeral 188.

Previous to the arrival of the carton at the filling station F the ice crusher 190 is idle, delivering no ice; the tamper 200 is held at a level above that of the upper edge of the carton as is the scraper 179 (thus permitting the carton to move into position beneath the tamper and the scraper) and no salt is being delivered from the salt bin. But when the carton C reaches the filling station F the various station mechanisms are automatically set in motion. The scraper 179 drops to the position shown in Fig. 2, the tamper 200 descends into the refrigerant chamber of the carton and commences its oscillatory tamping movement, the ice crusher 190 commences to operate and feed crushed ice into the carton, and the salt-delivering mechanism begins to function. Means are of course provided to stop this operation when the carton has been suitably charged with refrigerant.

In detail the automatic means for setting the filling and tamping mechanisms into operation are best illustrated in Figs. 2, 4, 6, and 11.

Referring first to the left hand portion of Fig. 2 and the lower portion of Fig. 4, a vertical shaft 225 is journaled in brackets 226 fixed to the casing 51. The lower end of this vertical shaft 225 is provided with an arm 224 which is normally maintained in the position shown in Fig. 4 by a coil spring. This arm 224 lies in substantially the same horizontal plane as that of the carton-carrying arms 120 so that as an arm 120 turns into position at the filling station F the strut 127 extending horizontally from the arm 120 encounters the arm 224, thus rotating the vertical shaft 225. The shaft 225 carries at its top end a similar arm 227.

Figure 11:
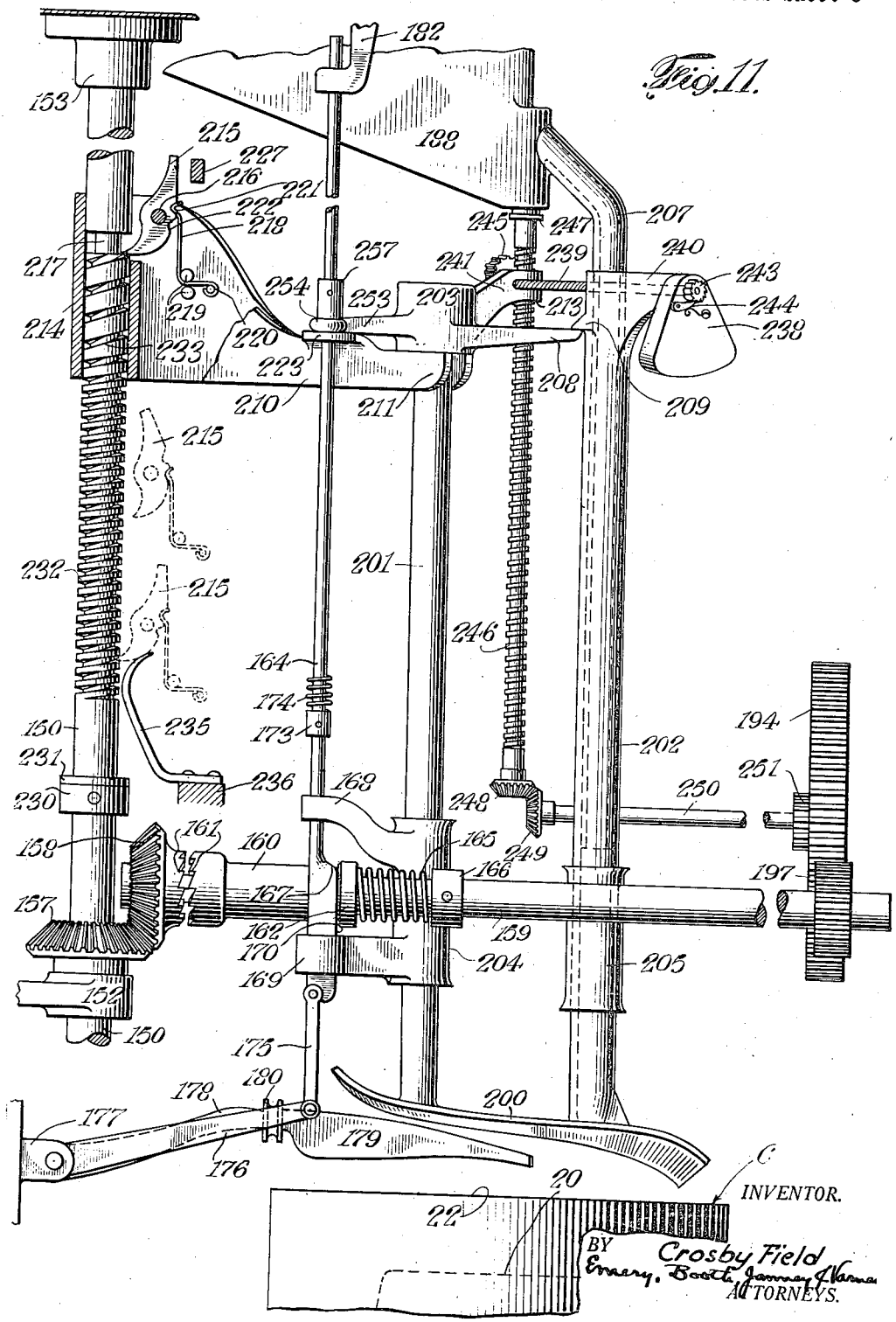
Fig. 11 is an enlarged elevation of the refrigerant-packing mechanism partially shown in Fig. 2.

Referring particularly to the upper left hand portion of Fig. 11, it will be observed that when the arm 227 is rotated it will strike the upper portion of a dog 215 which is pivoted by a pin 216 to the carriage 210. The dog 215 is provided with two notches, 221, 222 shaped to receive the formed end of a compression spring 218 secured by pins 219, 220 to the carriage 210, this spring exerting a constant pressure against the dog. As shown in the upper left hand portion of Fig. 11, the arm 227 has not yet encountered the upper end of the dog 215, and the spring, registering with the upper notch 221, holds the dog in the position shown. But when the arm 227 strikes the upper end of the dog 215 the latter is rotated counterclockwise on the pin 216 and the lower end of the dog removed from engagement with the annular groove 217 in which terminates the helical thread of the vertical shaft 150 which is mounted in suitable bearings 151, 152, 153, fixed to the casing 51 or parts integral therewith.

When the parts are in the position shown in Fig. 11 the upper portion of the shaft 150 is surrounded by the sleeve 214 forming an integral part of the carriage 210, the sleeve 214 fitting loosely around the shaft 150 so as to permit the carriage 210 to be dropped from the position in which it is shown in Fig. 11 to the position in which it is shown in Fig. 2. The carriage 210 will be so dropped when the dog 215 has been rotated out of contact with the helical worm thread of the shaft 150, as above described.

In the position shown in Fig. 11 the carriage 210 extending toward the right from the shaft 150 is provided at its right hand end with a fork 211 which underlies and supports a relatively heavy block 203 fixed to the depending rod 201 which forms one of the actuating members of the flexible tamper 200.

Parallel to the tamper-operating rod 201 and to the right of it, the hollow rod 202 is integral at its bottom end with the tamper 200 and is arranged to surround and slide upon the salt delivery pipe 207 which communicates at its top with the salt bin 188. Near the top of and integral with the hollow rod 202 the lug 209 projects toward the left in position to overlie and rest upon the right hand end of an arm 208 integral with the block 203. In this manner when the carriage 210 is allowed to drop from the position in which it is shown in Fig. 11 to that in which it is shown in Fig. 2, the rods 201, 202 will fall with the carriage and the tamper 200 will descend into the refrigerant chamber of the carton C as indicated in Fig. 2.

The oscillatory tamping action of the tamper 200 is obtained by a device best illustrated at the upper right hand portion of Fig. 11 where the hollow rod 202 is shown shaped at the top to form a bearing 240 through which extends a flexible shaft 239. Upon the right hand end of this flexible shaft an eccentric weight 238 is journaled so as to be freely rotatable upon and relatively to the shaft 239. The eccentric weight 238 is restrained from moving lengthwise of the shaft 239 by the ratchet wheel 243 fixed to the extreme right hand end of the shaft 239 and arranged to be engaged by the spring-pressed pawl 244 pivoted to the outer face of the weight 238. In this manner when the shaft 239 is rotated in one direction the weight 238 will be rotated with it; but as the weight 238 swings around in its rotative path a pulsing oscillatory effect will be transmitted to the tamper 200 by reason of the eccentricity of the weight. In this manner continued rotation of the eccentric weight 238 will affect the tamper 200 somewhat in the same manner as would result from a succession of light downward blows. The tamper will vibrate principally at its lower trailing end, the tamper being sufficiently flexible to prevent any considerable movement being transmitted to its front end which is weighted by the rod 201 and the block 203.

The flexible shaft 239 is journaled at its left hand end in an arm 241 integral with the block 203 previously mentioned. Fixed to the extreme left hand end of the shaft 239 is the pinion 245 which meshes with the worm thread of the vertical shaft 246, the upper end of which may be suitably journaled in a bearing 247 formed in the lower portion of the salt bin 188, other suitable bearings (not shown) for the shaft 246 being provided as convenient.

Since the shaft 239 with its pinion 245 is journaled in the arm 241 integral with the block 203, the descent of the block 203 (consequent upon the falling of the carriage 210 as previously described) will also cause the simultaneous descent not only of the rods 201, 202, but also of the flexible shaft 239 and its pinion 245 which, in moving downwardly, will roll along the vertical shaft 246. During this downward movement of the parts, the consequent rotation of the flexible shaft 239 is ineffective to rotate the eccentric weight 238 due to the disposition of the pawl 244 and ratchet 243. The rotation of the eccentric weight 238 is accomplished by the combined effect of the rotation of the vertical shaft 246 and the simultaneous upward movement of the tamper 200 and its associated parts which takes place progressively with the gradual filling of the carton with refrigerant as has been previously mentioned and as will hereinafter be more particularly described.

As best shown in the upper left hand portion of Fig. 2, the upper extremity of the shaft 246 projects through the bearing 247 into an extension of the salt bin 188, this upper extremity of the shaft 246 being provided with a helical fin 255 operative as a rotary conveyor to insure the steady feeding of salt from the bin 188 into the pipe 207 and thence downwardly through this pipe into and through the hollow rod 202, the bore of which terminates in an orifice in the rear side of the rod above the upper surface of the tamper 200 whereby salt may be fed into the refrigerant chamber of the carton C as previously indicated. The tamper 200 is inclined inwardly as appears in Fig. 15 and directs most of the salt fed upon its upper surface toward the inner cup 20 of the carton producing there a brine of especially low freezing point, though of course due to the vibratory movement of the tamper, some salt will be sprinkled to all points across the width of the annular refrigerant chamber of the carton.

Reverting once more to Fig. 11, the fall of the carriage 210 from the position in which it is shown in that figure to that in which it is shown in Fig. 2, not only lowers the tamping mechanism into operative position in the carton C, but also sets in motion the various mechanisms which cause ice and salt to be fed into the carton and properly distributed and tamped therein. The carriage 210 is provided with an ear 223 perforated to surround the vertical rod 164 which is mounted for limited up and down movement, and which may be secured and guided at its upper end by a fixed bracket 182 and otherwise secured by and guided in stationary bearings hereinafter to be described.

Fixed at a point near the upper end of the rod 164 is the collar 257 whereby the rod may be lifted and maintained in the position shown in Fig. 11 by means of the ring 254 shown just below the collar 257, the ring 254 being integral with the arm 253 fixed to the block 203. But when the carriage 210 drops from the position in which it is shown in Fig. 11 and when, consequently, the block 203 follows the carriage 210 downwardly, the rod 164 is no longer supported as above described.

As the carriage 210 drops downwardly the ear 223 integral with the carriage strikes the cushioning spring 174 surrounding the rod 164 just above the collar 173 which is pinned to the rod. As a result the rod 164 is impelled to its downward position as shown in Fig. 2, while the carriage 210 is arrested in its downward motion by the engagement of its sleeve 214 with the pad 231 of a collar 230 fixed to the shaft 150 and the dog 215 is re-engaged with the lower portion 232 of the helical thread of the shaft 150. This re-engagement of the dog 215 with the threaded shaft 150 is caused by the dog 215 impinging against the curved end of a resilient member 235 fixed to the casing as indicated at 236 and so shaped as to turn the dog 215 on its pivot into the position shown by the lower dotted outline of the dog.

The downward movement of the rod 164 previously referred to operates a clutch which sets in motion the ice and salt-feeding mechanisms and at the same time by means of connections at its lower extremity lowers the scraper 179 into operative position within the carton C. Referring Figure 11, the clutch mechanism includes a sleeve 160 slidably mounted on a squared portion of the horizontal shaft 159, and the sleeve is provided at its left hand end with teeth 161 which upon movement of the sleeve 160 toward the left engage similar teeth 161 on the bevel pinion 158 journaled to idle upon the left hand end of the shaft 159. The sleeve 160 is urged to the left or clutch-engaging position by a spring 165 coiled about the shaft 159 and pressing against the sleeve 160 at one end and against a collar 166 fixed to the shaft at its other end. The sleeve 160 may be freed to move toward the left by the downward movement of the rod 164, the lower portion of which is flattened to form the cam 167 which slides in guides 168, 169, extending from the fixed sleeve 204. The right hand portion of the cam 167 is so shaped that when the rod 164 moves to its lower position, the annular cam-follower 162 formed integrally with the sleeve 160, following the contour of the cam 167, will permit the sleeve 160 to move into clutch-engaging position while a return upward movement of the rod 164 and its cam 167 will cause the separation of the clutch members.

When the rod 164 drops to its lower position its descent is arrested (to prevent injury to the carton) by engagement of the collar 173 with the top surface of the guide member 168. Upon upward movement of the rod 164 the cam 167 first pushes the clutch sleeve to the right into inoperative position, after which the straight face 170 of the cam 167 holds the sleeve in this position, although leaving the rod 164 free to continue its upward movement as far as required.

The clutch-operated level pinon 158 is in constant rotative engagement with a similar bevel pinion 157 fixed upon the vertical shaft 150.

With particular reference to Fig. 2, this vertical shaft 150 stands idle except when a carton is in position for operation at the filling station F. As has been previously pointed out, the rotation of the carton-carrying arms 120 causes the gears 123 to roll around the central gear 72 with which the gears 123 are constantly in mesh when in their lower or operative position. As an arm 120 turns into position at the filling station F shown in the left hand central portion of Fig. 2, the gear 123 rolls into mesh with the gear 155 fixed upon the vertical shaft 150 near its lower end. Thus the shaft 150 begins to rotate, and through the bevel pinion 157 and the clutch mechanism previously described, rotates the horizontal shaft 159 which drives the salt and ice-feeding mechanisms and actuates the tamper as will presently be described in detail.

As shown in Fig. 11, the downward motion of the rod 164 not only causes the engagement of the clutch members previously mentioned, but also, through a pivotal connection at the lower end of the rod 164, lowers the link 175 the lower end of which is pivoted to the arm 176. The left hand end of the arm 176 is pivoted to a fixed bracket 177 and is integral with the supporting arm 178 of the scraper 179, the arm 178 being shaped to support and journal the grooved roller 180. When these parts last identified are depressed to the position shown in Fig. 2, the grooved roller 180 rests upon the circular edge of the carton C, and the scraper 179 lies within and below the edge of the carton C in position to prevent undue accumulation of ice and salt upon the bottom of the internal cup portion 20, directing the salt and ice thus removed into the annular refrigerant chamber which surrounds the cup 20.

The scraper 179 having been lowered into its operative position, and the clutch members associated with the rod 164 having moved into operative relationship, the horizontal driving shaft 159 is in rotation. As best shown in Fig. 11, the horizontal shaft 159 carries near its right hand end a driving pinion 197 which meshes with the larger gear 194. This gear 194 (see Figs. 2 and 5) is keyed to the grinding shaft 192 of the ice crusher 190, which within the body of the crusher is formed as a helical conveyor 193 serving to thrust the lumps of ice toward the left through the cutting knives 195 fixed to the left hand end of the conveyor shaft where the ice is comminuted and dumped into the carton C.

As has been previously mentioned, ice is supplied to the crusher 190 through a hopper surmounted by an insulated ice bin 185 which serves to contain a considerable quantity of ice and to protect it from melting. The ice bin 185 is provided with a sloping bottom 187 to facilitate the feeding of the ice, and is closed at the top by a cover 186.

Referring particularly to Figs. 2, 5 and 11, the ice-crusher-driving gear 194 also meshes with the small gear 251 mounted on the horizontal shaft 250 suitably held in fixed journals. At the left hand end of the shaft 250 the bevel gear 249 meshes with a similar bevel gear 248 fixed to the lower end of the vertical shaft 246, which, as previously mentioned, drives the salt-feeding mechanism journaled in the lower portion of the salt bin 188 to which access may be had by lifting the cover 189. When the ice crusher is in operation, therefore, the salt-feeding mechanism is also in operation, feeding salt as previously pointed out from the bin 188 downwardly through the pipe 207, through the hollow rod 202 slidably surrounding the pipe 207, and so into the carton C.

From the description thus far given the operation of the refrigerant feeding and tamping devices may be seen at the beginning of their functioning. As shown in Fig. 2, the carton C is being steadily rotated on its own axis by the rotation of its supporting table 126 fixed upon the top of the shaft 122 to which is keyed the gear 123 in mesh with the driving pinion 72. Within and near the bottom of the carton C the tamper 200 is in its lowest position and through the rotation of the eccentric weight 238 previously described, is being given an up and down oscillating movement. Crushed ice is being fed into the carton C from the crusher and salt is being fed into the carton along with the accumulating ice, and the scraper 179, stationary relatively to the rotating carton, is preventing undue accumulation of ice on the bottom of the carton cup 20.

As has already been explained, the feeding of ice and salt is begun at about the time the tamper reaches its lowermost position. As shown in Figs. 2 and 11 the tamper 200 is curved upward at its left hand end—the front end with reference to the direction of rotation of the carton—to form a raised toe, whereby as the carton C is rotated and the level of refrigerant rises therein, the tamper 200 will automatically rise and ride upon the surface of the refrigerant. The tamper in rising will raise the rod 201 and the block 203 bearing the arm 253 and its terminal ring 254 surrounding the rod 164.

When the carton is filled sufficiently with refrigerant, therefore, the ring 254 will impinge against the under side of the collar 257, thereby lifting the rod 164, disconnecting the clutch sleeve 160 from its complementary member, and so stopping further operation of the ice crusher, the salt feeder and the tamper-oscillating mechanism.

The carriage 210 meanwhile is being steadily raised by rotation of the shaft 150—the dog 215 having been reengaged with the worm thread 232 of the shaft, as explained—though preferably at a slower rate than the tamper is raised by the accumulation of refrigerant. The forked end of the carriage 210 will overtake the block 203 shortly after its upward rise has been halted by stoppage of the refrigerant supply, this position being attained at approximately the same time that dog 215 is entering upon the steep spiral threads 233 of shaft 150. The further rise of carriage 210 upon continued rotation of shaft 150 thereupon becomes more rapid and the parts are quickly returned to their upper positions where they are maintained by reason of the entry of dog 215 into the annular groove 217 of shaft 150.

This upper position of the tamper 200 and the scraper 179 is sufficiently high to clear the upper end of passing cartons even in the event the carton should be elevated by reason of the strut 127 being in upper position beneath the carton table 126—as it may be if the operator failed to lower it as it passed the delivery station.

The various mechanisms are so timed in their operation that the carton will have been completely charged with refrigerant and will be ready for the next operation before the carton-carrying arms 120 are given another one-third revolution. The manner of causing and timing these one-third revolutions and so moving the cartons from station to station, has already been described with reference to Figs. 3 and 4 except as to one detail best shown in Fig. 4 as follows: When the carton-carrying arm 120 moves into operative position at the filling station F, its movement into and its escape from such position are permitted by constructing the gears 123 of such diameter as exactly to bridge the distance between the gear 72 and the gear 155. Thus, when the arm 120 is in the position shown in Fig. 4, these gears are in operative relationship; but when, through the pawl and ratchet mechanism shown in Fig. 3, the carton-carrying arms are turned through another one-third revolution, the gear 123 may freely turn past and away from the gear 155 in a clockwise direction toward the sealing station S where the carton-sealing operations take place.

*Mechanisms and operations at the sealing station S*

At the sealing station S are located a supply of carton-sealing discs, means for feeding said discs one by one to the cartons as they reach the sealing station, and means for positioning a sealing disc in the end of each carton and sealing it in position hermetically to enclose the charge of ice and salt within the carton thus completing the carton-charging operation.

The devices operative in connection with the sealing of the cartons are best shown in Figs. 4, 5, 6, 7, 12, and 13.

Figure 6:
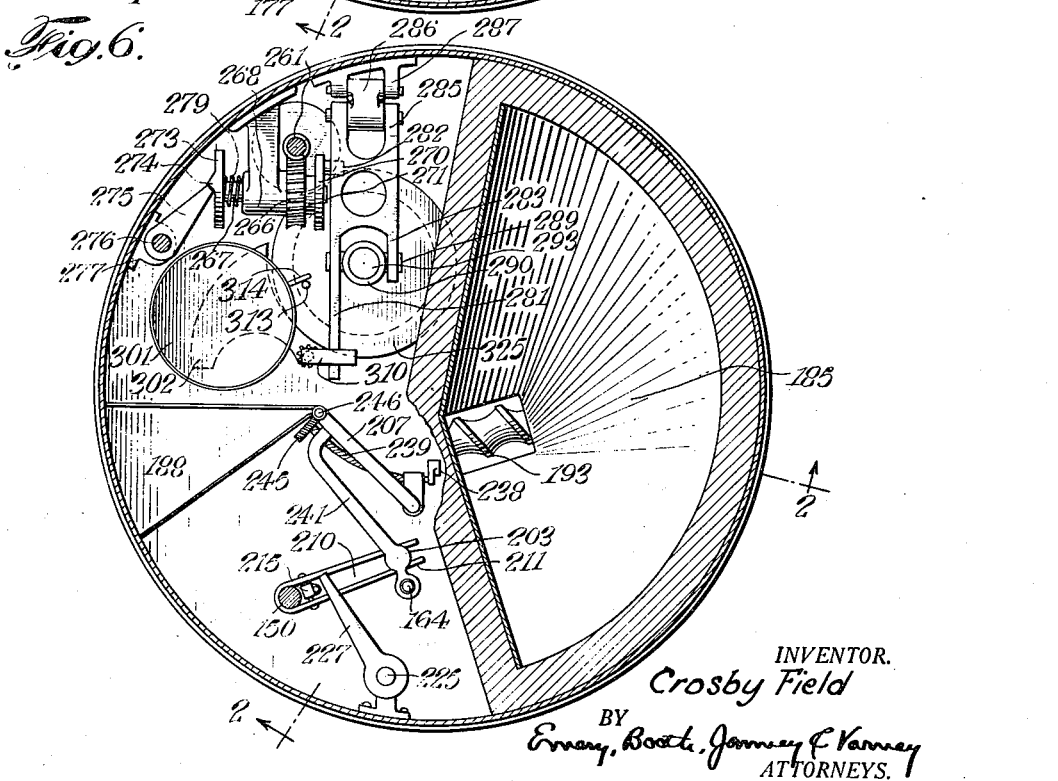
Fig. 6 is a horizontal section taken on the line 6—6 of Figs. 2 and 7.

Referring to the left hand portions of Figs. 5 and 6, the circular outline of the sealing disc reservoir is shown at 301. Associated with this reservoir is the segmentally shaped pusher 302 which is shown enlarged in Fig. 13 and which operates as best shown in the left hand portion of Fig. 12 to swing horizontally close beneath the lower open end of the sealing disc reservoir 301 and above the plate 303 upon which rests the lowermost of a vertical stack of discs enclosed within the reservoir. This pusher 302 is mounted to oscillate as shown in Figs. 5 and 6; and, as best shown in Fig. 12, when the pusher 302 swings from left to right across the plate 303, it pushes the lowermost sealing disc 23 out from under the superposed discs and feeds it through the slot 298 of the adjacently positioned sealing hood 297 wherein the disc 23 drops as far as the indented annulus 299, as shown by broken lines in Fig. 12. The sealing hood 297 and its associated mechanisms operate as will hereinafter be described, to carry the disc 23 downwardly into register with the upper end of the carton C and thereafter to seal it securely to the upper edge of the carton.

Assuming, then, that the sealing hood 297 has been properly supplied with a disc to close the end of the carton, the operations involved in positioning and sealing the disc in place will be best understood by following the inter-operation of the parts commencing at the point where, as the carton moves into position at the sealing station, the train of mechanisms is automatically connected with the power.

Referring to Fig. 4, the sealing station S is indicated in the upper left hand portion of the figure. As a carton-carrying arm 120 turns clockwise from the filling station F toward the sealing station S, the outer end of the arm 120, carrying the strut 127, swings the strut into sliding contact with the spring-pressed arm 280 which is fast to the vertical rod 276 journaled in the brackets 278 (Fig. 4), 277 (Fig. 6), secured to the shell 51. This rod 276, though not shown in elevation in any of the figures, will be understood as extending vertically from a point sufficiently low in the apparatus to make contact with the strut 127 as just described to a point near the top of the apparatus where, as best shown in the upper left hand portion of Fig. 6, the upper end of the rod 276 is provided with an arm 275. The free end of the arm 275 is shown in register with a lug 274 fixed to the face of the disc 273 which in turn is keyed to the short shaft 267 journaled in a fixed bearing 268.

Between the left hand end of this bearing 268 and the inner face of the disc 273, the helical spring 279 is compressed, tending to urge the shaft 267 toward the left. At the right hand end of the bearing 268 the toothed pinion 266 is journaled to turn freely about the shaft 267; and on the right hand end of the shaft 267 where it projects through and past the toothed pinion 266, the friction collar 271 is integral with the disc 270 which is fixed to the shaft 267. The disc 270 is provided with a horizontally extending pin 282 which as best shown in the upper right hand corner of Fig. 7 is adapted to project into a slot 284 of the arm 285 which is pivoted at its right hand end through the link 286 to the fixed bracket 287, so that as the pin 282 rotates with the disc 270 the arm 285 will be caused to swing downwardly, allowed a dwell in lower position, and subsequently be caused to swing upwardly for purposes later to be described.

The toothed pinion 266 meshes with a threaded vertical shaft 261 which, as best shown in the right hand portion of Fig. 7, is rotatably mounted in bearings 262, 263, the upper bearing 262 being provided with a raceway for ball bearings 264 positioned between the lower face of the bearing 262 and a suitable collar fixed to the shaft 261 whereby upward end-thrust upon the shaft 261 may be suitably taken up.

Near the lower end of the shaft 261 a toothed pinion 260 is keyed thereon, and as best shown in the lower portion of Fig. 7 and the upper left hand portion of Fig. 4, is driven through the gear 123 which, when the gear 123 is carried to the position shown at station S, meshes with the pinion 260 as well as with the central driving pinion 72.

Thus, as the carton-carrying arm 120 and its associated parts moves into position at station S, the shaft 261 commences to rotate, and the upper threaded end of the shaft 261 rotates the pinion 266, the further functioning of which may be best observed by referring to the upper left hand portion of Fig. 6.

As was previously pointed out, this toothed pinion 266 is mounted to turn freely on its shaft, but the friction collar 271 is constantly drawn against the face of the pinion 266 by the pulling action exerted on the shaft 267 at its left hand end by the compression spring 279 lying between the left hand end of the bearing 268 and the inner face of the disc 273.

So long as the disc 273 is held against rotation by the engagement of the lug 274 with the arm 275, the toothed pinion 266 will turn upon and relatively to the shaft 267, in spite of the friction between this pinion and the adjacent friction collar 271. But when the arm 275 is turned counterclockwise away from the lug 274 as has been already described in connection with Figs. 4 and 6, the lug 274 escapes past the end of the arm 275 and the frictional contact between the pinion 265 and the collar 271 will result in the shaft 267 being rotated together with the parts integral therewith. But as will be seen by referring to Fig. 4, only one rotation of these parts is permitted while any given carton is retained at the sealing station, for the reason that although the spring-pressed arm 280 is operated by the strut 127 to turn the vertical rod 276 and so turn the upper arm 275 away from engagement with the lug 274, nevertheless the rod 276 is promptly released to return to its original position, due to the fact that the strut 127 turns past the end of the arm 280 which is promptly pivoted inwardly by the spring behind it.

As has been shown, then, and as may best be reviewed in Fig. 7, the arrival of the carton-carrying arm 120 and its associated mechanisms at the sealing station S, results in the rotation of the vertical shaft 261 and of the toothed pinion 266 which now may cause the disc 270 to rotate with it during one revolution, and through the pin and slot engagement, reciprocate the pivoted arm 285.

It is through the arm 285 that the carton-sealing disc is lowered to the carton and sealed in position.

The construction of the arm 285 may be best seen in the upper right hand portion of Fig. 7 and the upper left hand portion of Fig. 6, where the arm is shown bifurcated to form prongs 281, 283 carrying trunnion pins 289 integral with the collar 290 so fitted upon the plunger 293 as to permit the latter to rotate, but not to slide, relative to the collar.

The vertical plunger 293 carries at its lower end, the disc-positioning and sealing mechanism.

The detailed construction and operation of these mechanisms may best be observed in Fig. 12. The plunger 293 is shown hollow throughout most of its length and terminates at its lower end in a circular flange 296 to the lower face of which is secured the annular insulated electric heating and expansion element 315.

The expansible heating element 315 indicated in Fig. 12 is formed as an incomplete ring almost meeting at its free ends and attached on the side opposite the free ends to the flange 296 through a web 317, such attachment permitting the ring at other portions to stand slightly clear of the flange. As shown in Fig. 12A the ring comprises a bimetallic shell composed of an outer portion 320 of a metal having a low co-efficient of expansion and an inner portion 321 of a metal having a high co-efficient of expansion, a somewhat flexible insulation 319 and a flat coiled resistance wire 318. The free ends of the resistance wire may be returned adjacent the web 317

(referring again to Fig. 12) and there connected respectively with the electrical leads 323, 324 extending upwardly into the hollow plunger 293. It will thus be clear that if the leads 323, 324 are connected to the two sides of an electrical circuit the resistance wire 318 will become hot, in turn rapidly heating the bi-metallic shell, causing it and the heating element 315 as a whole to increase in diameter.

As already explained with reference to the upper right hand corner of Fig. 7, rotation of disc 270 and pin 282 with the short shaft 267 will operate the arm 285 and impart a downward movement to the plunger 293. Reverting to Fig. 12, where, at the lower end of the plunger 293, the hood 297 is shown loosely carried on the flange 296, it is apparent that the hood 297 will drop until its internal annulus 299 comes to rest on the edge of the carton C. The carton fits rather closely within the hood 297, the rolled flange 300 of which, as best shown in Fig. 5, has come into contact with four guide rollers 330, 331, 332, 333 whereby the parts are steadied in position for accuracy of subsequent operations.

The plunger 293 with its heating element 315 will have further downward movement after the hood comes to rest upon the edge of the carton. Assuming a disc 23 to have been positioned within the hood 297 and resting upon the internal annulus 299, the disc will be engaged by the descending heating element 315 (which at the time is sufficiently cool and contracted to enter within the upstanding flange 29 of the disc) and be forced past the annulus 299 and into the end of the carton, as shown in dot and dash lines in the lower portion of Fig. 12, until the upper edge of the disc flange 29 is approximately flush with the top edge of the carton.

As the plunger 293 moves downwardly it cooperates with certain mechanism to establish electrical connections for supplying current to the resistance wire 318 of the heating element 315. This mechanism is most clearly shown in Fig. 12. The plunger 293 is provided above its terminal flange 296 with another integral flange 351 bearing upon its upper face an insulating washer 352. Above the flange 351 the plunger 293 is surrounded by a sleeve 337 of insulating material firmly fixed to the plunger. This insulating sleeve extends for some distance up the plunger where its upper end is formed to provide a flange 339. Surrounding the sleeve 337 is a second sleeve 336 of insulating material which fits so as to permit both sliding and rotative movement between the sleeve 337 and the sleeve 336. The outer sleeve 336 is in turn mounted within a fixed bearing 294, having a frictionally tight fit therein. The outer sleeve 336, at its upper end below the flange 339 of the inner sleeve 337, is provided with a flange 338, and is provided at its lower end with a second flange 345.

The lead wire 324 extends through an opening in the wall of the hollow plunger 293 and through the insulating sleeve 337 to connect, as by soldering, with a metal ferrule 348 recessed into the outer surface of the sleeve 337 in such manner that the outer surface of the ferrule is flush with the outer surface of the sleeve 337 and is received within the bore of the surrounding sleeve 336. Secured to the lower surface of the flange 345 of the outer sleeve 336 is a metal washer 346, which is kept in constant contact with the ferrule 348 and hence with the lead 324 through a spring-pressed metal plug 350. The washer 346 in turn is connected to an outside electrical conductor 347. By this arrangement of sliding contacts a constant connection is maintained between the lead 347 and the heating element through the lead 324.

It is arranged that movement of the plunger 293 will operate to make and break the electric connection to the other resistance wire lead 323 and for this purpose the upper flanges 339 and 338 of the inner and outer sleeves 337 and 336 are respectively provided with metal washers 343, 342 positioned to face each other. The washer 343 is electrically connected to the lead 323 which is insulated to extend through the wall of the hollow plunger 293 and the wall of the sleeve 337. The upper washer 342 on the outer sleeve 336 is connected to an outside electrical conductor 341, which is the second conductor of the circuit. It will thus be apparent that when the washers 342 and 343 are in contact the circuit will be closed through the resistance wire 318 of the heating element.

In operation the plunger 293 is moved downwardly in the manner heretofore described and will carry with it the sleeve 337 to bring the washers 343 and 342 into contact and complete the circuit through the resistance wire of the heating element. Further downward movement of the plunger 293 after the circuit has thus been completed will force the outer sleeve 336 through its bearing 294 overcoming the frictional resistance between the bearing and sleeve, the electrical circuit being constantly maintained during this movement.

As already indicated with reference to the upper right hand portion of Fig. 7, the shape of the slot 284 in the arm 285 is such that the parts will have a dwell in their lowermost position sufficient to permit the temperature of the heating element to be raised sufficiently to melt the sealing wax of the disc 23 and to expand and force the flange of the disc into firm engagement with the outside container 22 of the carton at this time held closely within the walls of the hood 297. At this time also the hood 297 and the heating element 315 are free to turn with the carton, the hood being loosely mounted on the flange 296 of the plunger 293, and the heating element being carried by the plunger 293 which is free to rotate within the outer sleeve 336.

After the disc has been hermetically sealed in the carton, continued operation lifts the plunger 293 and the heating element 315 away from the disc 23. This will be accomplished, in spite of the fact that the heating element has expanded into firm engagement with the flange 29 of the disc, because the upward pull which the heating element exerts upon the disc 23 is offset by air action due to the disc being hermetically sealed in the end of the carton.

As will be understood by referring to Fig. 12, when the plunger 293 begins to rise it separates the upper contact washers 342 and 343, stopping the supply of current to the heating element 315 which, being quite sensitive, will begin to cool and contract in diameter. After separation of the contacts 342 and 343 the plunger flange 351, through the insulating washer 352, will engage and lift the outer sleeve 336 and force it upward against frictional resistance in the bearing 294, into its upper position as shown in Figs. 7 and 12.

In describing the carton-sealing operations it has been assumed that a carton-sealing disc was already properly positioned within the sealing hood 297, as indicated in broken lines in Fig. 12. The introduction of a disc into position within the sealing hood takes place immediately upon the conclusion of the carton-sealing operation, just after the hood has been returned to its upper position as shown in Fig. 12. As has already been mentioned, and as may be observed in Figs. 7 and 12, the hood is provided with a slot 298 for the admission of a sealing disc 23. Obviously it is requisite that, as shown in Fig. 12, the slot 298 should be in proper position facing the reservoir 301, at the moment when a new disc is thrust out of the reservoir. To effect the proper orientation of the hood (and so the proper positioning of the disc-receiving slot) the hood carries, fixed upon its upper portion, a circular plate 325, which is freely rotatable with the hood about the plunger 293. This plate 325, as indicated in Fig. 7 is designed to cooperate with a resilient roller 327 fixed upon the vertical shaft 261 which is in rotation throughout the entire time during which the mechanisms at the carton-sealing station are in operation.

As best shown in the upper left hand portion of Fig. 5 and the right hand portion of Fig. 12, the plate 325 is provided with a curved peripheral notch 328, the curve of this notch being concentric with the resilient roller 327, the parts being so positioned that when the plate 325 lies in a plane within the vertical length of the resilient roller 327, the latter will contact with and turn the plate 325 until the curved notch 328 registers with the surface of the resilient roller 327. When the notch 328 reaches the roller, the latter will no longer cause rotation of the plate 325 and the hood 297, but will, on the contrary, act to prevent further rotative movement of the hood, the notch 328 being so positioned with respect to the hood that the disc-receiving slot 298 will be correctly positioned for receiving a disc when the roller 327 coincides with the notch 328. Further to insure the proper orientation of the hood 297, the plate 325 is provided with an upstanding lug 313 which, as the hood arrives at proper disc-receiving position, strikes against the finger 314 mounted upon the disc reservoir 301, or on any convenient stationary surface.

Referring to Fig. 12, where the plunger 293 and its cooperative elements are shown in their uppermost position, it will be observed that the position of the parts is as just described. The resilient roller 327 is in register with the notch 328 of the plate 325 and, consequently, the slot 298 is in position to receive a sealing disc 23 which is being thrust toward the slot. Obviously the subsequent downward movement of the plunger 293 and the sealing hood 297 will not be interfered with by the resilient roller 327.

The plate 325, when the parts are in lower operative position, lies below the resilient roller 327. But since, during the sealing operation, the carton C is in rotation about its own axis, and since the sealing hood 297 rotates with the carton during the sealing operation, the sealing hood, on being lifted away from the carton C, may still be turning, or in any event the position of the plate 325 is unlikely to be such that its curved notch will move immediately into register with the resilient roller 327. But since the roller 327 is resilient, the upward movement of the plunger 293, the hood 297, and its plate 325, will cause the latter to impinge upon and slide upwardly along the rotating surface of the resilient roller 327, which will rotate the plate 325 as it moves upwardly until the notch 328 and the roller coincide.

The detailed operation of the mechanisms which introduce a new sealing disc into the hood 297 upon its return from the sealing operation, may be best observed by reference to Figs. 7 and 13. In the upper right hand portion of Fig. 7, the arm 285, by its projecting prong 281, extends between the horizontally positioned arms 311, 312 integral with the vertical rod 310 which is slidably but non-rotatably mounted in suitable fixed guides (not shown). The lower end of the vertical rod 310 is provided (see Fig. 13) with helical splines 309 which register slidably with similar splines 307 cut in the upper portion of a nut 305 fast upon a shaft 306 which is mounted to rotate but not to slide in suitable bearing brackets (not shown). The nut 305 carries the pusher 302 integral therewith, so that vertical reciprocation of the rod 310 will cause horizontal oscillation of the pusher 302 whereby, as shown in Fig. 12, sealing discs may be successively thrust from the reservoir 301 into the sealing hood 297.

Reverting to Figs. 7 and 13, when the prong 281 moves down from the position in which it is shown in those figures, it permits the rod 310 to drop down by gravity. Through the action of the mating splines 309 and 307 the rod 310 by its weight exerts some force tending to turn the pusher 302 counterclockwise (i. e. toward the left as shown in Fig. 12). Further downward movement of the prong 281 brings it against the lower arm 312 of the vertical rod 310 to complete the counterclockwise withdrawing movement of the pusher 302 carrying it to the position shown in Fig. 5 and permitting a disc from the reservoir to drop down in front of its forward edge. The parts maintain this position until the plunger 293 and the prong 281 have returned almost to the end of their upward travel. At this point the prong 281 comes into contact with the upper arm 311 and moves the rod 310 upward imparting through the splines 307 and 309 a smart clockwise movement to the pusher 302, moving it into the position in which it is indicated in Fig. 6 and thereby feeding a disc into the hood 297 through the slot 298, the disc coming to rest upon the internal annulus 299 as indicated in broken lines in Fig. 12, and the parts are ready for another carton-sealing operation.

With the feeding in of a disc into the hood 297, the operations at the sealing station are complete and the mechanisms at this station are halted by the operation of parts previously referred to with reference to the upper left hand portion of Fig. 6, where renewed engagement between the arm 275 with the lug 274 on the disc 273 fixed to the shaft 267 causes the shaft to cease rotating and the arm 285 to become stationary, although the vertical shaft 261 is free to continue its rotation, turning the toothed pinion 266 about the shaft 267 against the friction of the adjacent collar 271.

The charged and sealed carton is now ready to be moved on from the sealing station S to the delivery station D, and, as previously described, when this point is reached, the various operations upon the other cartons at the other stations have also been concluded.

By mechanism previously described in connection with Figs. 2, 3, and 4, the carton-carrying arms 120 will now be given another one-third revolution. As may best be observed in the upper right hand portion of Fig. 4 and in the central portion of Fig. 2, a curved ramp 97 is fixed through brackets 98 to the shell 51 and is so positioned that as the carton which has just been sealed at station S moves clockwise toward the delivery station D, the lower (left hand) end of the ramp will be encountered by the strut 127 which will slide along the inclined surface of the ramp and so be raised to the position in which it is shown near the right hand side of Fig. 2. The strut 127, in being raised to this position, thrusts upwardly the carton-carrying table 126, the shaft 122, and the gear 123, the gear by this raising operation being removed from engagement with the constantly rotating gear 72. The filled and sealed carton thus arrives at the delivery station D in front of the window 100 ready for removal from the carton carrier. The operator tilts the carton-carrying table 126 in the manner previously explained and shown on the right hand side of Fig. 1 and removes the filled and sealed carton, replacing it by an empty carton.

While the detailed description has herein been confined to certain illustrative embodiments it is obvious that changes may be made relative thereto without departing from the spirit of the appended claims.

I claim:

1. In apparatus of the character described in combination, means for holding a carton, means for applying and sealing a cap on said carton, means for rotating the carton, means providing relative movement between the carton and said cap-applying and sealing means, and means including said carton-rotating means for setting said cap-applying and sealing means into operation when the carton is located adjacent thereto.

2. In apparatus of the character described in combination, a carrier for a carton supplied with a refrigerant, station mechanism including means for applying a cap to the carton and means for sealing the cap in position thereon, means on said carrier tending to cause operation of said station mechanism when a carton is disposed adjacent thereto, and means on said carrier for releasing said station mechanism for one cycle of operation when a carton is disposed adjacent thereto.

3. In apparatus of the character described in combination, a carrier for a carton supplied with a refrigerant, station mechanism including means for applying a cap to the carton and means for sealing the cap in position thereon, means on said carrier tending to cause operation of said station mechanism when a carton is disposed adjacent thereto, and means on said carrier for releasing said station mechanism for one cycle of operation when a carton is disposed adjacent thereto, said operating means on the carrier comprising a gear movable between an upper inoperative position and a lower operative position with respect to said station mechanism, and said releasing means comprising a strut adapted to hold said gear in upper position at which time the strut is inoperative with respect to said station mechanism.

4. In apparatus of the character described in combination, a carton carrier, station mechanism including means for applying a cap to the carton, and means active when a carton is disposed in capping position for securing operation of said station mechanism through one cycle, said means comprising a gear for rotating the carton.

5. In apparatus for capping cartons, in combination, a capper means for supplying caps to said capper including a reservoir for carton caps, an oscillatable member for feeding caps from the reservoir, a reciprocable rod having means thereon for producing oscillation of said member, and a swinging arm for reciprocating said rod, said capper including heating means for sealing each cap to its respective carton.

6. In apparatus of the character described in combination, a carton carrier, a hood adapted to embrace the top of a carton, means on said carton carrier for causing the hood to be lowered upon the carton when the same is positioned below the hood, projecting means within said hood supporting a cap for the carton, and means for forcing the cap past the projecting means and into covering relationship with respect to said carton.

7. In apparatus of the character described in combination, a carton carrier, a hood adapted to embrace the top of a carton, means on said carton carrier for causing the hood to be lowered upon the carton when the same is positioned below the hood, an annulus within said hood supporting a cap for the carton, and means for forcing the cap past the annulus and into covering relationship with respect to said carton, said means comprising a shaft passing through the top of said hood and a swinging arm for moving said shaft axially toward the carton.

8. In apparatus of the character described in combination, a carton carrier, a hood adapted to embrace the top of a carton, means on said carton carrier for causing the hood to be lowered upon the carton when the same is positioned below the hood, an annulus within said hood supporting a cap for the carton, and means for forcing the cap past the annulus and into covering relationship with respect to said carton, said means comprising a heating element for sealing the cap upon the carton.

9. In apparatus of the character described in combination, a carton carrier, a hood adapted to embrace the top of a carton, means on said carton carrier for causing the hood to be lowered upon the carton when the same is positioned below the hood, an annulus within said hood supporting a cap for the carton, and means for forcing the cap past the annulus and into covering relationship with respect to said carton, said means comprising an annular heating element for sealing the cap upon the carton.

10. In apparatus of the character described in combination, a carton carrier, a hood adapted to embrace the top of a carton, means on said carton carrier for causing the hood to be lowered upon the carton when the same is positioned below the hood, an annulus within said hood supporting a cap for the carton, and means for forcing the cap past the annulus and into covering relationship with respect to said carton, said means comprising a split annular heating element for sealing the cap upon the carton, said heating element being expansible to press the cap into firm engagement with the carton.

11. In apparatus of the character described in combination, a carton carrier, a hood adapted to embrace the top of a carton, means on said carton carrier for causing the hood to be lowered upon the carton when the same is positioned below the hood, an annulus within said hood supporting a cap for the carton, and means for forcing the cap past the annulus and into covering relationship with respect to said carton, said means comprising a reciprocable shaft and a split annular heating element supported thereon within the hood, said heating element being heated when moved toward the carton and allowed to cool when moved away, and means for operating said shaft to permit a dwell of said heating element upon the carton.

12. In apparatus of the character described in combination, a carton carrier, means for rotating said carrier, a hood adapted to be dropped upon the upper end of the carton when the same is positioned adjacent thereto, a shaft supporting said hood for rotative movement with the carton, an aperture in the side wall of said hood for receiving a cap, and means for stopping the hood with the aperture thereof in cap-receiving position when the hood is raised from the carton.

13. In apparatus for sealing a flanged cap upon a carton in combination, an electrically heated member fitting a cap loosely when cool but expansible to press the flange of the cap into firm engagement with the carton when heated, said member comprising a bimetallic split annular shell, an insulator within said shell, an electrical heating element within said insulator, and means to control the supply of electric current to said heating element.

14. In apparatus for sealing a flanged cap upon a carton, in combination, an electrically heated member fitting a cap loosely when cool but expansible to press the flange of the cap into firm engagement with the carton when heated, said member comprising a bimetallic split annular shell, an insulator within said shell, an electrical heating element within said insulator, and means to control the supply of electric current to said element, said means comprising a reciprocable plunger and contact sleeves embracing the plunger.

15. In apparatus for sealing a flanged cap upon a carton, in combination, an electrically heated element fitting a cap loosely when cool but expansible to press the flange of the cap into firm engagement with the carton when heated, said element comprising a bimetallic split annular shell, an insulator within said shell, an electrical resistor within said insulator and means to control the supply of electric current to said resistor, said means comprising a reciprocable plunger and relatively movable insulating sleeves embracing the plunger, said sleeves provided with contact members connected with the resistor and an outside current supply lead respectively.

16. In apparatus of the character described, in combination, a rotatable carton carrier, a rotatable capper having a cap receiving opening, a reservoir for carton caps, said reservoir and capper having axial movement with respect to each other, means for feeding caps from said reservoir to said capper and means for insuring the correct angular position of said rotatable capper with respect to said reservoir.

17. In apparatus of the character described, in combination, a reservoir for carton caps, means for applying said carton caps to a carton including a hood adapted to embrace the top of a carton, an oscillatable member for feeding caps from the reservoir into said hood, a reciprocable rod having means thereon for producing oscillation of said feeding member and a swinging arm for reciprocating said rod.

18. In an apparatus of the character described, in combination, a carrier for a carton, station mechanism including means for applying a cap to the carton and means for sealing the cap in position thereon, a reservoir for carton caps, a hood associated with said cap-applying means adapted to embrace the top of a carton, an oscillatable member for feeding caps from the reservoir into said hood, and a reciprocable rod having means thereon for producing oscillation of said member, said reciprocable rod being reciprocated by said station mechanism.

19. In apparatus of the character described, in combination, a carton carrier, a hood adapted to embrace the top of a carton, means on said carton carrier for causing the hood to be lowered upon the carton when the same is positioned below the hood, projecting means within said hood for supporting a cap for the carton, and means for forcing the cap past the projecting means and into covered relationship with respect to said carton.

20. In apparatus of the character described, in combination, a carton carrier, a hood adapted to embrace the top of a carton, at least one projection within said hood for supporting a cap for the carton, means for causing the hood to be lowered upon the carton when the same is positioned below the hood, and for forcing the cap past the projection and into covering relationship with respect to the carton, and means on said carton carrier for starting said hood-positioning means in operation.

21. In apparatus of the class described, in combination, a carton carrier, station mechanism including a hood adapted to embrace the top of the carton, a cap reservoir, means for supplying caps to said hood, means formed in said hood for supporting a cap for the carton, and means for forcing said cap past the supporting means and into covering position with respect to said carton; and means on said carton carrier adapted to cause the operation of said station mechanism when a carton is disposed adjacent thereto, said forcing means comprising an annular heating member for sealing the cap on the carton.

22. In apparatus of the class described, in combination, a carton carrier, station mechanism including a hood adapted to embrace the top of a carton on said carton carrier, a cap reservoir and means for moving a cap from said reservoir to said hood, means formed in said hood for supporting the cap supplied thereto, means for forcing the cap past the supporting means and into covering position with respect to said carton, and means on said carton carrier adapted to cause the operation of said station mechanism when a carton is disposed adjacent thereto; and said forcing means comprising an unclosed bimetallic annular heating member having a heating element associated therewith, said heating member being expansible to force the cap into close contact with the carton.

23. In apparatus of the character described, in combination, a carton carrier, means for rotating said carrier, a cap reservoir, a hood adapted to be positioned over the end of a carton when the same is positioned adjacent thereto, and a shaft for supporting said hood, the said side wall of said hood having an aperture therein for receiving caps from said reservoir, means for stopping the hood with the aperture thereof in cap-receiving position when the hood is raised from the carton, and means operable with the motion of said shaft or feeding caps from said reservoir into said aperture.

24. In apparatus of the class described, in combination, a carton carrier, a cap-applying means comprising a hood adapted to be positioned over the top of a carton, reservoir for holding flanged caps, means for feeding said flanged caps into said hood, and means for ejecting a cap in said hood into sealing relationship with respect to said carton, said means including an expansible heating member located within said hood, and movable axially relative thereto, said last named means acting to force said cap from a supported position in said hood into said carton, and to expand to force the flange of said cap into close contact with said carton.

25. In apparatus for sealing a wax-treated flanged cap to a carton, in combination, an electrically heated member fitting loosely within the periphery of said flange when cool, but expansible to press the flange of the cap into firm engagement with the carton when heated and to soften the wax of the wax-treated cap, whereby said cap is held to said carton by the adhesive action of said wax, when said wax cools.

26. An apparatus for covering a carton with a wax-treated flanged cap, in combination, a carton carrier, a hood for supporting a cap and adapted to be positioned over the top of the carton, a heating member within said hood for forcing said cover from said hood into covering position with respect to said carton, and then acting to expand to force the flange of said cap against the walls of said carton, and to heat the walls of said flange to soften the wax thereon, and then acting to withdraw from said carton leaving said cover in sealing position, and the atmospheric pressure acting to prevent said cover from moving with said heating member.

27. An apparatus of the character described, in combination, a rotating carton carrier, a capper including a hood adapted to embrace the top of a carton on said carton carrier and adapted to rotate therewith, said hood having a slot for receiving caps; a reservoir for said carton caps, and means for ejecting caps from said reservoir and into said slot while said hood is in a position above the carton carrier; means including a resilient rotating roller for frictionally rotating said hood while raised above said carton carrier for turning said hood to register said slot with said reservoir.

28. Apparatus for sealing a carton formed from wax treated material with a cap likewise formed from wax treated material, in combination, a carton holder, and a capper for applying a cap to a carton on said carton holder, said capper including means for simultaneously expanding and heating a flange on said cap to cause said flange to engage adjacent portions of said carton and to cause the wax of said wax treated material to seal said carton.

CROSBY FIELD.